UNITED STATES PATENT OFFICE.

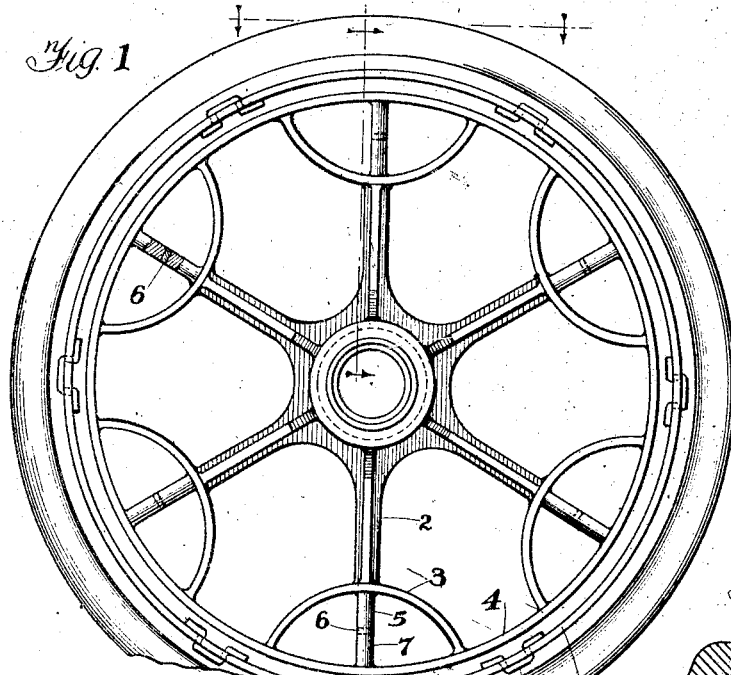
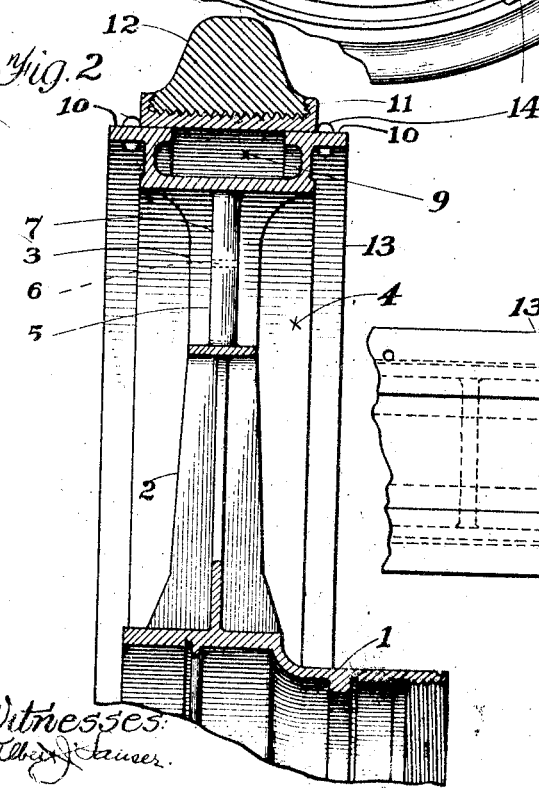
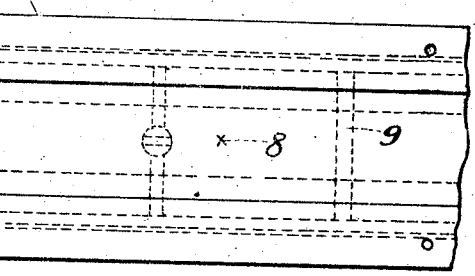
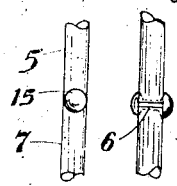
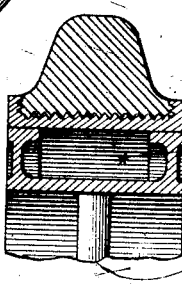

WILLIAM ERASTUS WILLIAMS, OF CHICAGO, ILLINOIS.

CAST-STEEL-SPOKED WHEEL.

1,387,529.         Specification of Letters Patent.      Patented Aug. 16, 1921.

Application filed September 18, 1919. Serial No. 324,497.

*To all whom it may concern:*

Be it known that I, WILLIAM ERASTUS WILLIAMS, a citizen of the United States, and a resident of Chicago, county of Cook, and State of Illinois, have invented a new and useful Improvement in Cast-Steel-Spoked Wheels, of which the following is a specification.

The object of my invention is to provide a light, very strong, spoked cast steel wheel and one that will have the fewest flaws from defective castings, owing to shrinkage strains and cracks and one that will have a certain degree of elasticity or resilience as a finished wheel.

The invention is set forth in the claims.

Reference will be had to the accompanying drawing, in which Figure 1 is a front elevation of the wheel.

Fig. 2 is a transverse sectional elevation.

Fig. 3 is a detail of a form of the rim, slightly modified from Fig. 2.

Fig. 4 is a plan of a section of the rim shown in Figs. 1 and 2.

Figs. 5 and 6 show a detailed alternate construction of a feature of the spokes.

In the drawing 1 indicates the ordinary hub of a cast steel wheel from which extend integral spokes 2 of cruciform cross section. These spokes 2 integrally unite with the crown portion of flat arch members 3 which are cast integral with the rim.

At the crown of each arch and at a corresponding point on the rim are provided alining cast spoke extensions, 5, 7, primarily separated by a narrow gap at 6. The main portion or body of the cast rim has cored spaces 8 across which extend approximately radial webs 9, shown in dotted lines in Fig. 4, and the outer circumferential face of this hollow rim is encircled by a common steel ring or band forming a tire base 11 which may receive a resilient tire 12, when such tire is used.

The tread 10 in Fig. 2 has a wide extending flange 13, through which staples 14 are fastened to prevent the tire from coming off. When what are known as "pressed on" tires are used, the wide flange 13 of the rim 4 is eliminated and the rim then appears as is shown in Fig. 3.

When the wheel is cast the spaces 6, between the projections 5 and 7 on the spokes are cast open and then after the wheel has been annealed these spaces are welded in by various systems of welding well known.

In place of welding in these sections I may simply connect them against thrusts or strut loads by drilling a hole across through the gap 6, as is indicated by Figs. 5 and 6, and then filling this drilled hole with a rivet as indicated by 15.

A cast steel wheel is a difficult casting to make, owing to the variation in shrinkage and also to the excessive shrinkage as relates to spokes and the rim itself.

By my flat arch members 3 the connections of the spokes 2 with the rim are so successfully made that any variation in the contraction between the rim and the spokes themselves will be accommodated by the arch members 3 springing either way and the gap 6 between the parts 5 and 7 permits this spring, and then when this gap 6 is filled in by welding a strong construction is obtained.

What I claim is:—

1. The method of forming a metal wheel which consists in integrally connecting the hub with the rim by spokes primarily divided and having the separated parts afterward united by rigid connections.

2. The method of forming a metal wheel which consists in connecting the hub to the rim by means of short spokes having at their outer ends arches extending to the rim and later rigidly bridging the space between the crown of each arch and the rim.

3. In a cast steel spoked wheel, a series of spokes extending from the hub in a plane and merged into the crown of arched members connected to the rim; with a continuation of the radial spoked members extending through and also connected to the rim.

4. In a cast wheel spokes extending from the hub and merged into arch shaped members connected to the rim with a projection extending on a radial line with the spokes between the arch and the rim, and this projection cast open and then filled in after the casting is made.

5. In a wheel of the class described, spokes extending from the hub and merged into arch shaped members connected to the rim; with a radial extension extending from the spoke ends across the arch to the rim and this extension cast open and filled in by welding after the casting is made.

6. A cast wheel having a box-like rim circumferentially open between lateral cylindrical flanges and internally divided by transverse webs, a hub with spokes each alining with one of the webs, and a tire carrying band encircling the flanges and webs and spanning the space between the flanges.

Signed at Chicago, in the county of Cook and State of Illinois, this fifteenth day of September, 1919.

WILLIAM ERASTUS WILLIAMS.

Witnesses:
B. J. BERNHARD,
J. B. JEFFERSON.